United States Patent
Lei

(10) Patent No.: US 10,623,492 B2
(45) Date of Patent: Apr. 14, 2020

(54) SERVICE PROCESSING METHOD, RELATED DEVICE, AND SYSTEM

(71) Applicant: Huawei Technologies Co., Ltd., Shenzhen (CN)

(72) Inventor: Xiaosong Lei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 15/204,457

(22) Filed: Jul. 7, 2016

(65) Prior Publication Data
US 2016/0323384 A1    Nov. 3, 2016

Related U.S. Application Data

(63) Continuation of application No. PCT/CN2014/078769, filed on May 29, 2014.

(51) Int. Cl.
| H04L 12/26 | (2006.01) |
| G06F 3/06 | (2006.01) |
| G06F 5/01 | (2006.01) |
| G06F 13/42 | (2006.01) |
| H04L 29/08 | (2006.01) |

(52) U.S. Cl.
CPC .......... H04L 67/1097 (2013.01); H04L 67/16 (2013.01)

(58) Field of Classification Search
CPC combination set(s) only.
See application file for complete search history.

(56) References Cited

U.S. PATENT DOCUMENTS

| 7,231,401 B1 | 6/2007 | Inohara et al. |
| 8,214,529 B2 | 7/2012 | Kanevsky et al. |
| 8,327,102 B1 * | 12/2012 | Palsule ................. G06F 3/0617 711/162 |
| 8,700,875 B1 | 4/2014 | Barron et al. |

(Continued)

FOREIGN PATENT DOCUMENTS

| CN | 101969475 A | 2/2011 |
| CN | 102055730 A | 5/2011 |

(Continued)

OTHER PUBLICATIONS

"ATA Over Ethernet," XP055312285, Wikipedia, Oct. 19, 2016, 3 pages.

(Continued)

Primary Examiner — Kevin T Bates
Assistant Examiner — Mark A Scott
(74) Attorney, Agent, or Firm — Conley Rose, P.C.

(57) ABSTRACT

A service processing method, a related device, and a system are provided. The method includes receiving, by the controller, a service request, determining, by the controller, an extended service capability required by the service request, acquiring, by the controller, information about an extended service capability provided by at least one of the Ethernet interface hard disks, and instructing, by the controller according to the information about the extended service capability provided by the at least one of the Ethernet interface hard disks, an Ethernet interface hard disk to process the service request, where the Ethernet interface hard disk has the extended service capability required by the service request. This improves service processing efficiency.

22 Claims, 5 Drawing Sheets

---

A controller receives a service request, and the controller determines an extended service capability required by the service request — 210

The controller acquires information about an extended service capability provided by at least one of Ethernet interface hard disks — 220

The controller instructs, according to the information about the extended service capability provided by the at least one of the Ethernet interface hard disks, an Ethernet interface hard disk to process the service request, where the Ethernet interface hard disk has the extended service capability required by the service request — 230

(56) References Cited

U.S. PATENT DOCUMENTS

| | | | |
|---|---|---|---|
| 9,141,542 B1* | 9/2015 | Justiss | G06F 17/30067 |
| 2003/0126059 A1* | 7/2003 | Hensley | G06Q 10/10 |
| | | | 705/36 R |
| 2003/0204597 A1 | 10/2003 | Arakawa et al. | |
| 2004/0221005 A1 | 11/2004 | Albaugh et al. | |
| 2006/0059287 A1* | 3/2006 | Rivard | G06F 9/4411 |
| | | | 710/300 |
| 2006/0069861 A1 | 3/2006 | Amano | |
| 2006/0248306 A1 | 11/2006 | Suishu et al. | |
| 2007/0203950 A1 | 8/2007 | Inohara et al. | |
| 2007/0250872 A1* | 10/2007 | Dua | H04N 7/163 |
| | | | 725/81 |
| 2008/0148032 A1* | 6/2008 | Freimuth | G06F 13/42 |
| | | | 713/1 |
| 2009/0327480 A1* | 12/2009 | Wookey | H04L 41/12 |
| | | | 709/224 |
| 2010/0161843 A1* | 6/2010 | Spry | H04L 67/1097 |
| | | | 710/22 |
| 2010/0195538 A1* | 8/2010 | Merkey | H04L 43/02 |
| | | | 370/255 |
| 2012/0102291 A1 | 4/2012 | Cherian et al. | |
| 2012/0158799 A1 | 6/2012 | Morsi et al. | |
| 2012/0278551 A1* | 11/2012 | Chakhaiyar | G06F 13/385 |
| | | | 711/114 |
| 2013/0073747 A1* | 3/2013 | Klughart | G06F 3/0607 |
| | | | 710/5 |
| 2013/0086303 A1* | 4/2013 | Ludwig | G06F 21/00 |
| | | | 711/103 |
| 2013/0159452 A1* | 6/2013 | Saldana De Fuentes | |
| | | | G06F 15/167 |
| | | | 709/213 |
| 2013/0297894 A1* | 11/2013 | Cohen | G06F 3/0679 |
| | | | 711/154 |
| 2013/0339738 A1* | 12/2013 | Shaw | H04L 9/085 |
| | | | 713/171 |
| 2013/0346365 A1* | 12/2013 | Kan | G06F 3/061 |
| | | | 707/610 |
| 2014/0006597 A1* | 1/2014 | Ganguli | G06F 9/5072 |
| | | | 709/224 |
| 2014/0013112 A1 | 1/2014 | Cidon et al. | |
| 2014/0047062 A1* | 2/2014 | Krueger | H04L 67/2842 |
| | | | 709/216 |
| 2014/0244724 A1* | 8/2014 | Patrick | H04L 67/1097 |
| | | | 709/203 |
| 2014/0244928 A1* | 8/2014 | Tiwari | G06F 11/1088 |
| | | | 711/114 |
| 2014/0310370 A1* | 10/2014 | Hendel | H04L 67/1097 |
| | | | 709/212 |
| 2014/0325261 A1* | 10/2014 | Munireddy | G06F 11/1441 |
| | | | 714/6.22 |
| 2014/0337540 A1* | 11/2014 | Johnson | G06F 13/14 |
| | | | 710/5 |
| 2015/0012607 A1* | 1/2015 | Cayton | H04L 67/1097 |
| | | | 709/212 |
| 2015/0032841 A1* | 1/2015 | Vasudevan | G06F 3/0613 |
| | | | 709/216 |
| 2015/0039712 A1* | 2/2015 | Frank | H04L 67/40 |
| | | | 709/212 |
| 2015/0120855 A1* | 4/2015 | Izenberg | H04L 67/1097 |
| | | | 709/212 |
| 2015/0121066 A1* | 4/2015 | Nix | H04W 4/70 |
| | | | 713/155 |
| 2015/0160872 A1* | 6/2015 | Chen | G06F 3/0619 |
| | | | 711/114 |
| 2015/0193302 A1* | 7/2015 | Hyun | G11C 29/52 |
| | | | 714/764 |
| 2015/0199205 A1* | 7/2015 | Chakravarthy | G06F 9/455 |
| | | | 718/1 |
| 2015/0212754 A1* | 7/2015 | Kasper | G06F 3/0619 |
| | | | 711/114 |
| 2015/0261434 A1* | 9/2015 | Kagan | G06F 13/28 |
| | | | 711/103 |
| 2015/0341273 A1* | 11/2015 | Naouri | H04L 47/18 |
| | | | 370/231 |
| 2016/0085479 A1* | 3/2016 | Edmiston | G06F 3/0659 |
| | | | 711/154 |
| 2016/0293274 A1* | 10/2016 | Schuh | G06F 12/0246 |
| 2017/0018050 A1* | 1/2017 | Roy | G06F 12/1036 |
| 2017/0237563 A1* | 8/2017 | El-Moussa | G06F 21/44 |
| | | | 713/193 |
| 2017/0249281 A1* | 8/2017 | Tamir | G06F 15/167 |

FOREIGN PATENT DOCUMENTS

| | | |
|---|---|---|
| CN | 103546572 A | 1/2014 |
| EP | 1357465 A2 | 10/2003 |
| JP | 2000122814 A | 4/2000 |
| JP | 2003316522 A | 11/2003 |
| JP | 2006309483 A | 11/2006 |
| TW | 200817890 A | 4/2008 |

OTHER PUBLICATIONS

Foreign Communication From A Counterpart Application, European Application No. 14893399.7, Extended European Search Report dated Nov. 25, 2016, 10 pages.

Foreign Communication From A Counterpart Application, Japanese Application No. 2016-533567, Japanese Office Action dated Oct. 7, 2017, 3 pages.

Foreign Communication From A Counterpart Application, Japanese Application No. 2016-533567, English Translation of Japanese Office Action dated Oct. 7, 2017, 3 pages.

Foreign Communication From A Counterpart Application, Japanese Application No. 2016-533567, Japanese Notice of Allowance dated Jun. 5, 2018, 3 pages.

Partial English Translation and Abstract of Chinese Patent Application No. CN102055730, Apr. 25, 2016, 7 pages.

Partial English Translation and Abstract of Taiwanese Patent Application No. TW2008017890, Aug. 3, 2016, 6 pages.

Foreign Communication From A Counterpart Application, Taiwanese Application No. 10520356140, Taiwanese Office Action dated Mar. 29, 2016, 15 pages.

Foreign Communication Form A Counterpart Application, Taiwanese Application No. 10520356140, Taiwanese Search Report dated Mar. 29, 2016, 1 pages.

Foreign Communication From A Counterpart Application, PCT Application No. PCT/CN2014/078769, English Translation of International Search Report dated Mar. 2, 2015, 2 pages.

Foreign Communication From A Counterpart Application, PCT Application No. PCT/CN2014/078769, Written Opinion dated Mar. 2, 2015, 7 pages.

Foreign Communication From a Counterpart Application, Indian Application No. 201617013178, Indian Office Action dated Nov. 27, 2019, 7 pages.

\* cited by examiner

SERVICE PROCESSING METHOD, RELATED DEVICE, AND SYSTEM

CROSS-REFERENCE TO RELATED APPLICATIONS

This application is a continuation of International Application No. PCT/CN2014/078769, filed on May 29, 2014, which is hereby incorporated by reference in their entireties.

TECHNICAL FIELD

The present disclosure relates to the field of communications and computer technologies, and in particular, to a service processing method, a related device, and a system.

BACKGROUND

Emergence of cloud storage accelerates application of an interface by using key/value manner. An Ethernet interface hard disk that uses value semantics has appeared in the industry. Different from a conventional hard disk that uses the Small Computer System Interface protocol standard, an Ethernet interface hard disk uses the Internet Protocol (IP) to perform external communication and provides external Ethernet interfaces.

A current Ethernet interface hard disk is different from a conventional hard disk (which is also referred to as a conventional passive hard disk). A conventional passive hard disk provides only a data storage capability, while an Ethernet interface hard disk not only can store data, but also has a computing capability and therefore can provide a service capability (for ease-of description in the following, the service capability that is provided by the Ethernet interface hard disk using its own computing capability is briefly referred to as an extended service capability) in addition to a data storage capability. Extended service capabilities of Ethernet interface hard disks may vary with hard disk vendors and hard disk release versions. However, a user of an Ethernet interface hard disk does not know what extended service capabilities the Ethernet interface hard disk has. When the user wants to use an Ethernet interface hard disk in a cluster storage system to perform service processing, for example, when the user wants to compress data in a tar format on the Ethernet interface hard disk, it is difficult for a controller in the cluster storage system to find an Ethernet interface hard disk having a corresponding capability, to perform service processing, resulting in relatively low service processing efficiency.

SUMMARY

To resolve a problem in the prior art, embodiments of the present disclosure provide a service processing method, a related device, and a cluster storage system.

A first aspect of the present disclosure provides a service processing method, where the method is applied to a cluster storage system, and the cluster storage system includes a controller and multiple Ethernet interface hard disks, where each of the Ethernet interface hard disks has an extended service capability, and the extended service capability does not include a data storage capability, and the method includes receiving, by the controller, a service request, determining, by the controller, an extended service capability required by the service request, acquiring, by the controller, information about an extended service capability provided by at least one of the Ethernet interface hard disks, and instructing, by the controller according to the information about the extended service capability provided by the at least one of the Ethernet interface hard disks, an Ethernet interface hard disk to process the service request, where the Ethernet interface hard disk has the extended service capability required by the service request.

In a first possible implementation manner, the acquiring, by the controller, information about an extended service capability provided by at least one of the Ethernet interface hard disks includes acquiring, by the controller by querying a hard disk information database, the information about the extended service capability provided by the at least one of the Ethernet interface hard disks, where the hard disk information database is used to store information about the extended service capability of the Ethernet interface hard disk.

With reference to the first aspect or the first possible implementation manner of the first aspect, in a second possible implementation manner, the acquiring, by the controller, information about an extended service capability provided by at least one of the Ethernet interface hard disks includes sending, by the controller, an extended service capability query message to each of the Ethernet interface hard disks, and receiving information about the extended service capability that is returned by the at least one of the Ethernet interface hard disks.

With reference to the first aspect or the first or the second possible implementation manner of the first aspect, in a third possible implementation manner, the information about the extended service capability includes at least one type of the following information about a basic hard disk capability, information about an advanced service capability, and information about a capability set, where the information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported, the information about an advanced service capability includes the identification information of the Ethernet interface hard disk and description information of the advanced service capability, where the description information of the advanced service capability includes at least one type of the following information: a capability name, a capability identifier, and a capability parameter option, and the information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

With reference to the third possible implementation manner of the first aspect, in a fourth possible implementation manner, the identification information of the Ethernet interface hard disk includes at least one type of the following information, a vendor identifier, a product identifier, a hard disk sequence, and a firmware version identifier (ID).

A second aspect of the present disclosure provides a service processing method, where the method is applied to a cluster storage system, and the cluster storage system includes a controller, an Ethernet interface hard disk, and a hard disk information database, where the Ethernet interface hard disk has an extended service capability, and the extended service capability does not include a data storage capability, and the method includes registering, by the Ethernet interface hard disk, information about the extended service capability with the hard disk information database such that the controller acquires the information about the extended service capability from the hard disk information database, and when the information about the extended service capability meets an extended service capability required by a service request, receiving, by the Ethernet interface hard disk, the service request from the controller, and processing the service request.

In a first possible implementation manner, the information about the extended service capability includes at least one type of the following information about a basic hard disk capability, information about an advanced service capability, and information about a capability set, where the information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported, the information about an advanced service capability includes the an identification information of the Ethernet interface hard disk and description information of the advanced service capability, where the description information of the advanced service capability includes at least one type of the following information: a capability name, a capability identifier, and a capability parameter option, and the information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

A third aspect of the present disclosure provides a service processing method, where the method is applied to a cluster storage system, and the cluster storage system includes a controller and an Ethernet interface hard disk, where the Ethernet interface hard disk has an extended service capability, and the extended service capability does not include a data storage capability, and the method includes receiving, by the Ethernet interface hard disk, an extended service capability query message sent by the controller, and returning information about the extended service capability of the Ethernet interface hard disk to the controller, and when the information about the extended service capability meets an extended service capability required by a service request, receiving, by the Ethernet interface hard disk, the service request from the controller, and processing the service request.

In a first possible implementation manner, the information about the extended service capability includes at least one type of the following: information about a basic hard disk capability, information about an advanced service capability, and information about a capability set, where the information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported, the information about an advanced service capability includes the identification information of the Ethernet interface hard disk and description information of the advanced service capability, where the description information of the advanced service capability includes at least one type of the following information: a capability name, a capability identifier, and a capability parameter option, and the information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

A fourth aspect of the present disclosure provides a controller, where the controller is applied to a cluster storage system, and the cluster storage system includes the controller and multiple Ethernet interface hard disks, where each of the Ethernet interface hard disks has an extended service capability, and the extended service capability does not include a data storage capability, and the controller includes a receiving module, configured to receive a service request, a determining module, configured to determine an extended service capability required by the service request, an acquiring module, configured to acquire information about an extended service capability provided by at least one of the Ethernet interface hard disks, and a scheduling module, configured to instruct, according to the information about the extended service capability provided by the at least one of the Ethernet interface hard disks, an Ethernet interface hard disk to process the service request, where the Ethernet interface hard disk has the extended service capability required by the service request.

In a first possible implementation manner, the acquiring module includes a querying unit, configured to acquire, by querying a hard disk information database, the information about the extended service capability provided by the at least one of the Ethernet interface hard disks, where the hard disk information database is used to store information about the extended service capability of the Ethernet interface hard disk.

With reference to the fourth aspect or the first possible implementation manner of the fourth aspect, in a second possible implementation manner, the acquiring module includes a transceiver unit, configured to send an extended service capability query message to each of the Ethernet interface hard disks, and receive information about the extended service capability that is returned by the at least one of the Ethernet interface hard disks.

With reference to the fourth aspect of the present disclosure or the first or the second possible implementation manner of the fourth aspect, in a third possible implementation manner, the information about the extended service capability includes at least one type of the following: information about a basic hard disk capability, information about an advanced service capability, and information about a capability set, where the information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported, the information about an advanced service capability includes the identification information of the Ethernet interface hard disk and description information of the advanced service capability, where the description information of the advanced service capability includes at least one type of the following information: a capability name, a capability identifier, and a capability parameter option, and the information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

With reference to the third possible implementation manner of the fourth aspect of the present disclosure, in a fourth possible implementation manner, the identification information of the Ethernet interface hard disk includes at least one type of the following information: a vendor identifier, a product identifier, a hard disk sequence, and a firmware version ID.

A fifth aspect of the present disclosure provides an Ethernet interface hard disk, where the Ethernet interface hard disk is applied to a cluster storage system, and the cluster storage system includes a controller, the Ethernet interface hard disk, and a hard disk information database, where the Ethernet interface hard disk has an extended service capability, and the extended service capability does not include a data storage capability, and the Ethernet interface hard disk includes a registering module, configured to register information about the extended service capability with the hard disk information database such that the controller acquires the information about the extended service capability from the hard disk information database, a receiving module, configured to when the information about the extended service capability meets an extended service capability required by a service request, receive the service request from the controller, and process the service request.

In a first possible implementation manner, the information about the extended service capability includes at least one type of the following information about a basic hard disk capability, information about an advanced service capability, and information about a capability set, where the information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported, the information about an advanced service capability includes the identification information of the Ethernet interface hard disk and description information of the advanced service capability, where the description information of the advanced service capability includes at least one type of the following information: a capability name, a capability identifier, and a capability parameter option, and the information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

A sixth aspect of the present disclosure provides an Ethernet interface hard disk, where the Ethernet interface hard disk is applied to a cluster storage system, and the cluster storage system includes a controller, the Ethernet interface hard disk, and a hard disk information database, where the Ethernet interface hard disk has an extended service capability, and the extended service capability does not include a data storage capability, and the Ethernet interface hard disk includes a receiving module, configured to receive an extended service capability query message sent by the controller, a sending module, configured to return information about the extended service capability of the Ethernet interface hard disk to the controller, the receiving module, further configured to when the information about the extended service capability meets an extended service capability required by a service request, receive the service request from the controller, and process the service request.

In a first possible implementation manner, the information about the extended service capability includes at least one type of the following: information about a basic hard disk capability, information about an advanced service capability, and information about a capability set, where the information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported, the information about an advanced service capability includes the identification information of the Ethernet interface hard disk and description information of the advanced service capability, where the description information of the advanced service capability includes at least one type of the following information: a capability name, a capability identifier, and a capability parameter option, and the information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

A seventh aspect of the present disclosure provides a cluster storage system, including the Ethernet interface hard disk according to the fifth or the sixth aspect of the present disclosure, and the controller according to the fourth aspect of the present disclosure.

An eighth aspect of the present disclosure provides a controller, where the controller includes a processor, a memory, a bus, and a communication interface, where the memory is configured to store a computer executable instruction, and the processor is connected to the memory using the bus, and when the controller runs, the processor executes the computer executable instruction stored in the memory such that the controller executes the service processing method according to the first aspect of the present disclosure.

A ninth aspect of the present disclosure provides an Ethernet interface hard disk, where the Ethernet interface hard disk includes a processor, a memory, a bus, and a communication interface, where the memory is configured to store a computer executable instruction, and the processor is connected to the memory using the bus, and when the Ethernet interface hard disk runs, the processor executes the computer executable instruction stored in the memory such that the Ethernet interface hard disk executes the service processing method according to the second aspect or the third aspect of the present disclosure.

A tenth aspect of the present disclosure provides a computer readable medium, where the computer readable medium includes a computer executable instruction such that when a processor of a computer executes the computer executable instruction, the computer executes the service processing method according to the first aspect of the present disclosure.

An eleventh aspect of the present disclosure provides a computer readable medium, where the computer readable medium includes a computer executable instruction such that when a processor of a computer executes the computer executable instruction, the computer executes the service processing method according to the second aspect or the third aspect of the present disclosure.

It can be learned from the foregoing description that, in some feasible implementation manners of the present disclosure, after receiving a service request, a controller may determine an extended service capability required by the service request, and acquire information about an extended service capability provided by an Ethernet interface hard disk such that the service request can be scheduled to an Ethernet interface hard disk that has the extended service capability required by the service request, and the Ethernet interface hard disk that has the extended service capability required by the service request is instructed to process the service request. This resolves a problem in the prior art that it is difficult to find an Ethernet interface hard disk that has a corresponding capability to perform service processing, and the following technical effect is obtained because a cluster storage system can acquire information about an extended service capability of each Ethernet interface hard disk, the cluster storage system may perform corresponding scheduling on a received service request, and instruct an Ethernet interface hard disk to process the received service request, where the Ethernet interface hard disk has a corresponding capability, thereby improving work efficiency of the cluster storage system for service processing.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Embodiments of the present disclosure provide a service processing method, a related device, and a cluster storage system, to schedule a service request to an Ethernet interface hard disk having a corresponding extended service capability, thereby improving work efficiency of the cluster storage system.

To make a person skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The following describes specific embodiments in detail.

The technical solutions of the present disclosure are applied to a cluster storage system. The following introduces this system first.

Figure 1A:
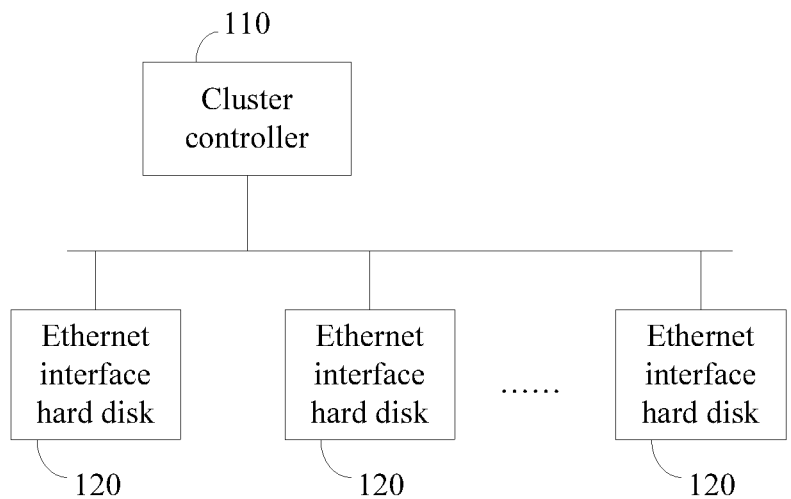
FIG. 1A is a schematic diagram of a cluster storage system according to an embodiment of the present disclosure.

Referring to FIG. 1A, a cluster storage system described in an embodiment of the present disclosure may include a controller 110 and multiple Ethernet interface hard disks 120, where each of the Ethernet interface hard disks has an extended service capability, and the extended service capability does not include a data storage capability.

The controller may be a cluster controller, a cluster service database, or another device that is in the cluster storage system.

Compared with a conventional passive hard disk, the Ethernet interface hard disk has an embedded processor added and has a computing capability. The Ethernet interface hard disk can not only process read, write, and status monitoring operations defined by a Small Computer System Interface (SCSI), but also use a processor embedded in the Ethernet interface hard disk to run independently without using a host machine, to provide, in addition to a data storage capability, a service capability, that is, an extended service capability (for ease of description in the following, the service capability that is provided by the Ethernet interface hard disk using its own computing capability is briefly referred to as the extended service capability). For example, the Ethernet interface hard disk can provide an extended service capability that is provided using value semantic interface. For another example, the Ethernet interface hard disk can provide an extended service capability that is supported by application code specified by a user, for example, performing virus scanning on the hard disk, executing integrity check on the data of the hard disk, compressing the data of the hard disk, performing garbage collection on the hard disk, migrating and copying the data of the hard disk to another hard disk, encrypting the data of the hard disk based on a key provided by the user, or executing a user-defined policy. However, extended service capabilities supported by Ethernet interface hard disks vary with hard disk vendors, hard disk versions, user-customized policies, or the like. For example, a GNU zip (GZIP) or a GNU unzip (GNUZIP) compression algorithm is built in some hard disks, object-level deduplication is built in some hard disks, and an advanced encryption standard (AES) encryption capability is built in some hard disks. All of the foregoing compression algorithm, object-level deduplication, and encryption capability belong to extended service capabilities described in this embodiment of the present disclosure. As a result, a user of an Ethernet interface hard disk does not know what extended service capabilities the Ethernet interface hard disk has. When a hard disk user wants to perform corresponding processing using the Ethernet interface hard disk, the cluster storage system is required to schedule a service request to an Ethernet interface hard disk to perform service processing, where the Ethernet interface hard disk has a corresponding capability, that is, to instruct an Ethernet interface hard disk to process the service request, where the Ethernet interface hard disk has an extended service capability required by the service request.

Figure 1B:
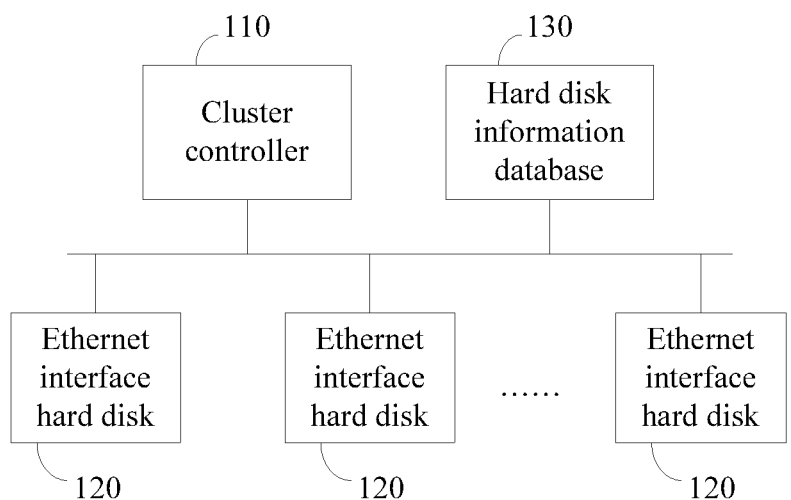
FIG. 1B is a schematic diagram of another cluster storage system according to an embodiment of the present disclosure.
Figure 2:
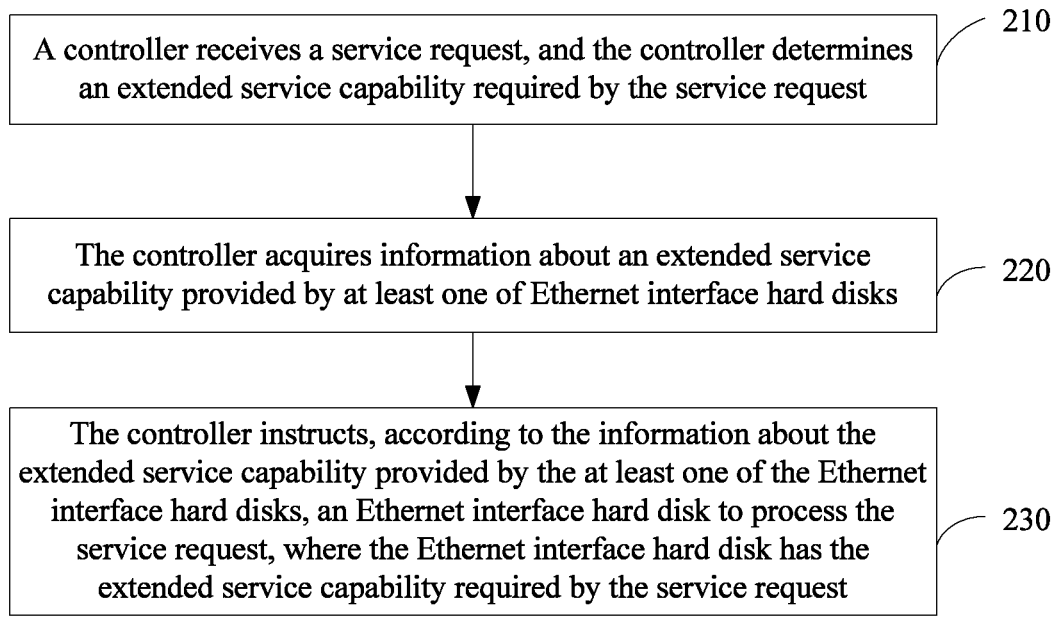
FIG. 2 is a schematic diagram of a service processing method according to an embodiment of the present disclosure.

Referring to FIG. 2, an embodiment of the present disclosure provides a service processing method, where the method is applied to the cluster storage system shown in FIG. 1, and the cluster storage system includes a controller and multiple Ethernet interface hard disks, where each of the Ethernet interface hard disks has an extended service capability, and the extended service capability does not include a data storage capability. The method may include the following steps:

Step 210. The controller receives a service request, and the controller determines an extended service capability required by the service request.

A service request that is sent by a user using an application end to the cluster storage system first arrives at the controller of the cluster storage system, and the controller analyzes the received service request and determines an extended service capability required by the service request. Different service requests require different extended service capabilities. For example, the required extended service capability may include performing virus scanning on the hard disk, executing integrity check on data of the hard disk, compressing the data of the hard disk, performing garbage collection on the hard disk, migrating and copying the data of the hard disk to another hard disk, encrypting the data of the hard disk using provided by the user, executing a user-defined policy, or the like. The hard disk is a short name for the Ethernet interface hard disk.

Step 220. The controller acquires information about an extended service capability provided by at least one of the Ethernet interface hard disks.

In this embodiment of the present disclosure, the Ethernet interface hard disk has a computing capability because a processor is embedded in the Ethernet interface hard disk. For example, the Ethernet interface hard disk may be a hard disk that is based on an advanced reduced instruction set computing machines (ARM) system, and may provide an extended service capability and exchange information with another device such as the controller. Therefore, in this embodiment of the present disclosure, the controller can acquire the information about the extended service capability provided by the at least one of the Ethernet interface hard disks.

In an implementation manner, the controller may directly exchange information with an Ethernet interface hard disk to acquire information about an extended service capability of the Ethernet interface hard disk. In this implementation manner, the controller may send an extended service capability query message to each of the Ethernet interface hard disks, and after receiving the extended service capability query message, the Ethernet interface hard disk returns its own capability information to the controller. Then, the controller may receive information about the extended service capability that is returned by the at least one of the Ethernet interface hard disks.

In another implementation manner, as shown in FIG. 1B, the cluster storage system may further include a hard disk information database 130, where the hard disk information database is used to store registered information about the extended service capability of the Ethernet interface hard disk. In this implementation manner, the Ethernet interface hard disk may register information about its own extended service capability with the hard disk information database, that is, sending a registration message carrying the information about its own extended service capability to the hard disk information database, then, the hard disk information database may be used to receive the registration message, and extract and store the carried information about the extended service capability, and the controller may acquire, by querying the hard disk information database, the information about the extended service capability provided by the at least one of the Ethernet interface hard disks.

In some other implementation manners, the Ethernet interface hard disk may further externally provide information about its own extended service capability in another manner. For example, the Ethernet interface hard disk may actively or passively transmit information about its own extended service capability to a device specified by the user, where the specified device may be a device inside the cluster storage system, or may be a network device outside the cluster storage system, and the controller may acquire information about the extended service capability of the at least one Ethernet interface hard disk by querying the specified device. For another example, the Ethernet interface hard disk may actively broadcast information about its own extended service capability to various devices within a range of a target network, including the controller. In addition, other manners may also be used, which are not described herein again. In summary, in this embodiment of the present disclosure, a manner in which the Ethernet interface hard disk provides the information about its own extended service capability to an external device is not limited, and a manner in which the controller acquires the information about the extended service capability of the Ethernet interface hard disk is not limited, either.

Step 230. The controller instructs, according to the information about the extended service capability provided by the at least one of the Ethernet interface hard disks, an Ethernet interface hard disk to process the service request, where the Ethernet interface hard disk has the extended service capability required by the service request.

The controller may select, according to acquired information about extended service capabilities of the multiple Ethernet interface hard disks, an Ethernet interface hard disk that has the extended service capability required by the service request, schedule the service request to the selected Ethernet interface hard disk, and instruct the Ethernet interface hard disk to perform corresponding service processing on the service request, where the Ethernet interface hard disk has the extended service capability required by the service request. The scheduling includes sending the service request to the Ethernet interface hard disk that has the extended service capability required by the service request.

The following describes the information about the extended service capability provided by the Ethernet interface hard disk.

The extended service capability of the Ethernet interface hard disk may include a basic hard disk capability and an advanced service capability, where the basic hard disk capability includes a hardware capability of the Ethernet interface hard disk, and the advanced service capability has an extended service capability that is provided by the Ethernet interface hard disk based on a computing capability of a processor embedded in the Ethernet interface hard disk, for example, a service capability that the processor embedded in the Ethernet interface hard disk can provide by executing software code loaded to the Ethernet interface hard disk, that is, a capability that can be provided using embedded firmware. The advanced service capability may include, for example, at least one of the following capabilities: a compression capability, a decompression capability, an antivirus capability, a check capability, an encryption capability, a decryption capability, and the like. Certainly, the foregoing several advanced service capabilities are merely described as examples to facilitate understanding, and are not intended to limit the technical solutions of the present disclosure. In a specific application, multiple extended service capabilities may be further combined and be represented in a form of a capability set, where the capability set may include multiple basic hard disk capabilities or multiple advanced service capabilities. One Ethernet interface hard disk may include multiple capability sets.

In this embodiment of the present disclosure, the information about the extended service capability may include identification information of the Ethernet interface hard disk and description information of the extended service capability. The identification information of the Ethernet interface hard disk and the description information of the extended service capability may be combined in different combination manners to form a complete information description.

According to the foregoing classification of the extended service capability, in this embodiment of the present disclosure, the information about the extended service capability may include at least one type of the following: information about the basic hard disk capability, information about the advanced service capability, and information about the capability set.

The information about the basic hard disk capability may include the identification information of the Ethernet interface hard disk and description information of the basic hard disk capability of the Ethernet interface hard disk. The description information of the basic hard disk capability may include at least one type of the following information: a quantity of ports, a supported port type, a type of a processor embedded in a hard disk, a hard disk rotational speed, and whether speed regulation or sleeping is supported. The description information of the Ethernet interface hard disk may include one or a combination of a vendor identifier, a product ID, a hard disk sequence, and a firmware version ID.

The information about the advanced service capability may include the identification information of the Ethernet interface hard disk and description information of the advanced service capability of the Ethernet interface hard disk. The description information of the advanced service capability may include at least one type of the following information: a capability name, a capability identifier, and a capability parameter option. The identification information of the Ethernet interface hard disk may include at least one type of the following information: a vendor identifier, a product identifier, a hard disk sequence, and a firmware version ID. For example, the information about the extended service capability may be represented in a manner of a vendor identifier and a capability name (for example, Seagate+GZIP). For example, for an extended service capability that is loaded by an application such as an application that is loaded to the Ethernet interface hard disk using an application-oriented virtual machine, a plug-in such as mobile code, or a dynamic link library, a capability name (for example, AppUUID) and a capability identifier (for example, two types of compression algorithms are loaded to an application and a same compression capability is provided, the capability identifier may be used to distinguish different compression algorithms) that are of this application and are globally unique, may be used to represent description information of the extended service capability that is of the Ethernet interface hard disk and loaded by the application. In this embodiment of the present disclosure, for the extended service capability, in addition to the capability name and the capability identifier, a parameter option corresponding to the extended service capability may be further provided. For example, the parameter option may be a definite value, a range, or even a met condition.

The information about the capability set may include the identification information of the Ethernet interface hard disk and description information of the capability set. The description information of the capability set may include an identifier of the capability set, and description information of a basic hard disk capability included in the capability set or description information of an advanced service capability included in the capability set. The identification information of the Ethernet interface hard disk may include at least one type of the following information: a vendor identifier, a product identifier, a hard disk sequence, and a firmware version ID. In this embodiment of the present disclosure, a group of extended service capabilities may be packaged, and information about a capability set is used to indicate that the Ethernet interface hard disk supports a series of extended service capabilities. For example, multiple basic hard disk capabilities may be packaged into a basic capability set (BasicCapabilitySet), and one capability set identifier may be allocated to this set. For example, for Ethernet interface hard disks having different hard disk vendors, versions, or sequences, a combination of a vendor identifier, a firmware version ID, and a hard disk serial number may be used as identification information of the Ethernet interface hard disks, to uniquely determine a type of an Ethernet interface hard disk, and then description information of a capability set corresponding to the hard disk type may be queried according to a preset hard disk information database. For example, for a hard disk whose vendor ID, version ID, and series number (No) are manufacturer A, version 20131027, and sequence 001, respectively, description information of a corresponding capability set may include a compression algorithm such as GZIP, actively generating check data, supporting an remote direct memory access (RDMA) over converged Ethernet (RoCE) interface, and the like.

In some implementation manners, different extended service capabilities may be combined into multiple groups of optional capability sets that may be sorted by priority, where one priority is allocated to each capability set. For example, because resources required by some extended service capabilities may affect each other, extended service capabilities of services of a same type may be classified into different capability sets. The controller may select a capability set to use according to a current resource use situation of the Ethernet interface hard disk or according to a priority of a capability set. Generally, a capability set having a high priority is preferentially selected.

In some implementation manners, if more than two of extended service capabilities included in a capability set belong to a same group, that is, the more than two extended service capabilities provide same or similar capabilities, such as two types of compression algorithms, preferably, different priorities may be allocated to different extended service capabilities of the same group, such as two types of compression algorithms group.

It can be learned from the foregoing description that, the identification information of the Ethernet interface hard disk may include at least one type of the following information: a vendor identifier, a product identifier, a hard disk sequence, and a firmware version ID. For example, a vendor identifier of a hard disk vendor Seagate may be represented as Seagate, Seagate may produce products of several brands or series, and products of different brands or series may be represented using different identifiers, products of a same series may also have several different types and several different hard disk sequences, and because products of a same hard disk serial number are released synchronously and products may be upgraded subsequently, version IDs of firmware of the products may also be different. The firmware refers to software that is permanently written into the Ethernet interface hard disk.

According to the foregoing description, a system according to this embodiment of the present disclosure provides a service processing method such that an Ethernet interface hard disk may externally provide information about an extended service capability supported by the Ethernet interface hard disk, and a controller may acquire information about an extended service capability that is provided by at least one Ethernet interface hard disk. This method mechanism may include two parts. One part is an expression manner of information about the extended service capability. In this embodiment, multiple expression manners, for example, information about a basic hard disk capability, information about an advanced service capability, and information about a capability set, are listed as examples. The other part is a manner of externally providing and acquiring the information about the extended service capability. In this embodiment, multiple expression manners, for example, that the controller queries the Ethernet interface hard disk, and that the Ethernet interface hard disk registers with a hard disk information database, are listed as examples. However, it should be understood that the multiple manners listed above are merely some implementation manners of the present disclosure and are not intended to limit the present disclosure. According to the spirit of the present disclosure, there may be other manners in which capability information is provided.

By using the technical solution in this embodiment of the present disclosure, when an Ethernet interface hard disk joins a cluster storage system and the cluster storage system performs application scheduling, a controller can acquire information about an extended service capability of each Ethernet interface hard disk, and may perform corresponding service scheduling according to the extended service capability supported by each Ethernet interface hard disk, to instruct an Ethernet interface hard disk to process a service request, where the Ethernet interface hard disk has a corresponding capability.

It can be learned from the foregoing description that, in some feasible implementation manners of the present disclosure, after receiving a service request, a controller may determine an extended service capability required by the service request, and acquire information about an extended service capability provided by an Ethernet interface hard disk such that the service request can be scheduled to an Ethernet interface hard disk that has the extended service capability required by the service request, and the Ethernet interface hard disk that has the extended service capability required by the service request is instructed to process the service request. This resolves a problem in the prior art that it is difficult to find an Ethernet interface hard disk that has a corresponding capability to perform service processing, and the following technical effect is obtained because a cluster storage system can acquire information about an extended service capability of each Ethernet interface hard disk, the cluster storage system may perform corresponding scheduling on a received service request, and instruct an Ethernet interface hard disk to process the received service request, where the Ethernet interface hard disk has a corresponding capability, thereby improving work efficiency of the cluster storage system for service processing.

Figure 3:
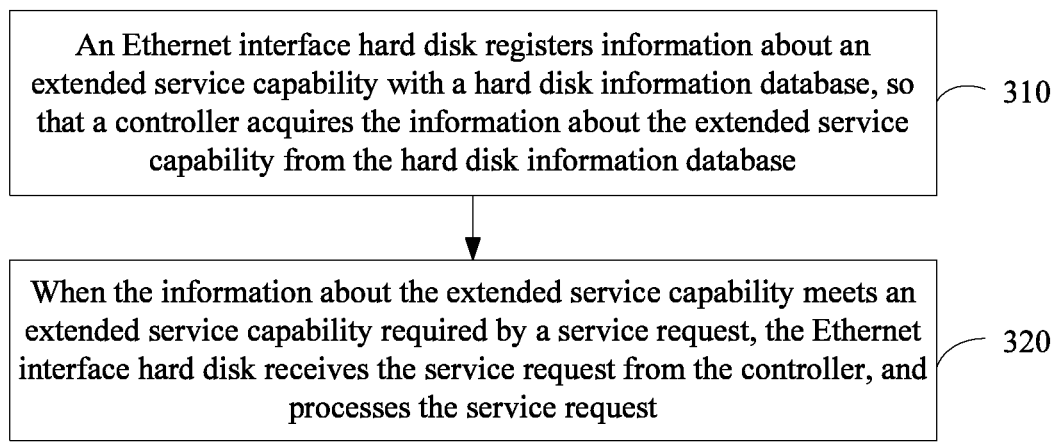
FIG. 3 is a schematic diagram of another service processing method according to an embodiment of the present disclosure.

As shown in FIG. 3, an embodiment of the present disclosure further provides a service processing method, where the method is applied to the cluster storage system shown in FIG. 1, and the cluster storage system includes a controller and multiple Ethernet interface hard disks, where each of the Ethernet interface hard disks has an extended service capability, and the extended service capability does not include a data storage capability. The method may include the following steps:

Step 310. The Ethernet interface hard disk registers information about an extended service capability with a hard disk information database such that the controller acquires the information about the extended service capability from the hard disk information database.

Step 320. When the information about the extended service capability meets an extended service capability required by a service request, the Ethernet interface hard disk receives the service request from the controller, and processes the service request.

In some embodiments of the present disclosure, the information about the extended service capability includes at least one type of the following: information about a basic hard disk capability, information about an advanced service capability, and information about a capability set.

The information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported.

The information about an advanced service capability includes the identification information of the Ethernet interface hard disk and description information of the advanced service capability, where the description information of the advanced service capability includes at least one type of the following information: a capability name, a capability identifier, and a capability parameter option.

The information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

It can be learned from the foregoing description that, in this embodiment of the present disclosure, the following technical solution is used, an Ethernet interface hard disk registers information about its own extended service capability with a hard disk information database for a controller to acquire by means of query such that the controller may query, after receiving a service request, the hard disk information database to obtain an Ethernet interface hard disk that has a corresponding extended service capability, schedule the service request to the Ethernet interface hard disk for processing, and instruct the Ethernet interface hard disk to process the received service request, where the Ethernet interface hard disk has the corresponding capability, thereby improving service processing efficiency.

Figure 4:
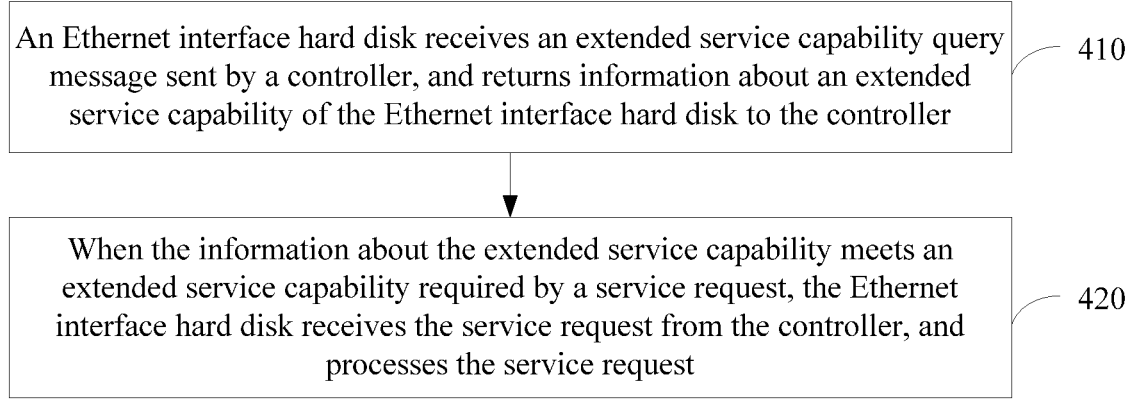
FIG. 4 is a schematic diagram of still another service processing method according to an embodiment of the present disclosure.

As shown in FIG. 4, an embodiment of the present disclosure further provides another service processing method, where the method is applied to the cluster storage system shown in FIG. 1, and the cluster storage system includes a controller and multiple Ethernet interface hard disks, where each of the Ethernet interface hard disks has an extended service capability, and the extended service capability does not include a data storage capability. The method may include the following steps:

Step 410. The Ethernet interface hard disk receives an extended service capability query message sent by the controller, and returns information about an extended service capability of the Ethernet interface hard disk to the controller.

Step 420. When the information about the extended service capability meets an extended service capability required by a service request, the Ethernet interface hard disk receives the service request from the controller, and processes the service request.

In some embodiments of the present disclosure, the information about the extended service capability includes at least one type of the following: information about a basic hard disk capability, information about an advanced service capability, and information about a capability set.

The information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported.

The information about an advanced service capability includes the identification information of the Ethernet interface hard disk and description information of the advanced service capability, where the description information of the advanced service capability includes at least one type of the following information: a capability name, a capability identifier, and a capability parameter option.

The information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

In this embodiment of the present disclosure, the following technical solution is used, a controller sends an extended service capability query message when necessary, and after receiving the extended service capability query message, an Ethernet interface hard disk reports information about its own extended service capability to the controller such that the controller may select, after receiving a service request, an Ethernet interface hard disk that has a corresponding extended service capability and schedule the service request to the Ethernet interface hard disk for processing, thereby improving service processing efficiency.

According to the foregoing description, in the service processing method provided in this embodiment of the present disclosure, an Ethernet interface hard disk may notify a controller of information about an extended service capability of the Ethernet interface hard disk in a manner such as actively registering with a hard disk information database or reporting after receiving an extended service capability query message such that the controller may schedule, after receiving a service request, the service request to an Ethernet interface hard disk that has an extended service capability required by the service request, and instruct the Ethernet interface hard disk to process the service request, where the Ethernet interface hard disk has the extended service capability required by the service request. This resolves a problem in the prior art that it is difficult to find an Ethernet interface hard disk that has a corresponding capability to perform service processing, and the following technical effect is obtained because a cluster storage system can acquire information about an extended service capability of each Ethernet interface hard disk, the cluster storage system may perform corresponding scheduling on a received service request, and instruct an Ethernet interface hard disk to process the received service request, where the Ethernet interface hard disk has a corresponding capability, thereby improving work efficiency of the cluster storage system for service processing.

Figure 5:
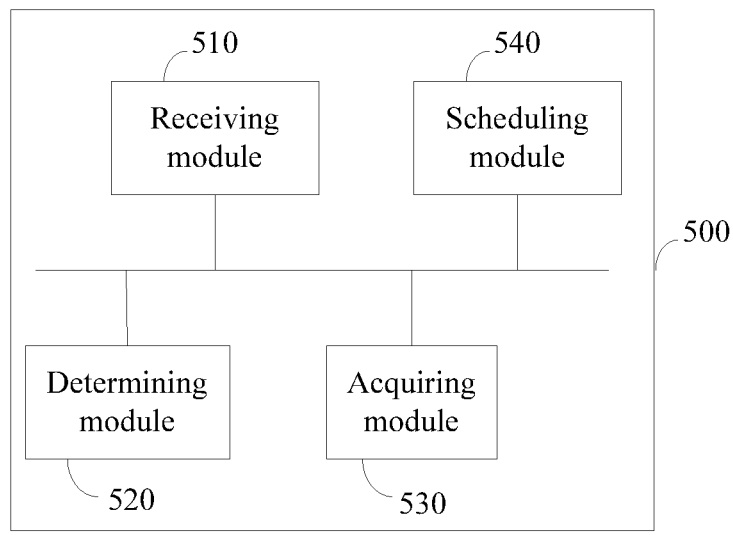
FIG. 5 is a schematic diagram of a controller according to an embodiment of the present disclosure.

Referring to FIG. 5, an embodiment of the present disclosure provides a controller 500, where the controller is applied to the cluster storage system shown in FIG. 1, and the cluster storage system includes the controller and multiple Ethernet interface hard disks, where each of the Ethernet interface hard disks has an extended service capability, and the extended service capability does not include a data storage capability. The controller 500 may include a receiving module 510, configured to receive a service request, a determining module 520, configured to determine an extended service capability required by the service request, an acquiring module 530, configured to acquire information about an extended service capability provided by at least one of the Ethernet interface hard disks, and a scheduling module 540, configured to instruct, according to the information about the extended service capability provided by the at least one of the Ethernet interface hard disks, an Ethernet interface hard disk to process the service request, where the Ethernet interface hard disk has the extended service capability required by the service request.

In some embodiments of the present disclosure, the acquiring module 530 includes a querying unit, configured to acquire, by querying a hard disk information database, the information about the extended service capability provided by the at least one of the Ethernet interface hard disks, where the hard disk information database is used to store information about the extended service capability of the Ethernet interface hard disk.

In some embodiments of the present disclosure, the acquiring module 530 includes a transceiver unit, configured to send an extended service capability query message to each of the Ethernet interface hard disks, and receive information about the extended service capability that is returned by the at least one of the Ethernet interface hard disks.

In some embodiments of the present disclosure, the information about the extended service capability includes at least one type of the following: information about a basic hard disk capability, information about an advanced service capability, and information about a capability set.

The information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported.

The information about an advanced service capability includes the identification information of the Ethernet interface hard disk and description information of the advanced service capability, where the description information of the advanced service capability includes at least one type of the following information: a capability name, a capability identifier, and a capability parameter option.

The information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

In some embodiments of the present disclosure, the identification information of the Ethernet interface hard disk includes at least one type of the following information: a vendor identifier, a product identifier, a hard disk sequence, and a firmware version ID.

The controller provided in this embodiment of the present disclosure can execute a method procedure of the service processing method shown in FIG. 2, which is not described herein again in this embodiment of the present disclosure.

It may be learned from the foregoing description that, in some feasible implementation manners of the present disclosure, after receiving a service request, a controller may determine an extended service capability required by the service request, and acquire information about an extended service capability provided by an Ethernet interface hard disk such that the service request can be scheduled to an Ethernet interface hard disk that has the extended service capability required by the service request, and the Ethernet interface hard disk that has the extended service capability required by the service request is instructed to process the service request. This resolves a problem in the prior art that it is difficult to find an Ethernet interface hard disk that has a corresponding capability to perform service processing, and the following technical effect is obtained, because a cluster storage system can acquire information about an extended service capability of each Ethernet interface hard disk, the cluster storage system may perform corresponding scheduling on a received service request, and instruct an Ethernet interface hard disk to process the received service request, where the Ethernet interface hard disk has a corresponding capability, thereby improving work efficiency of the cluster storage system for service processing.

Figure 6:
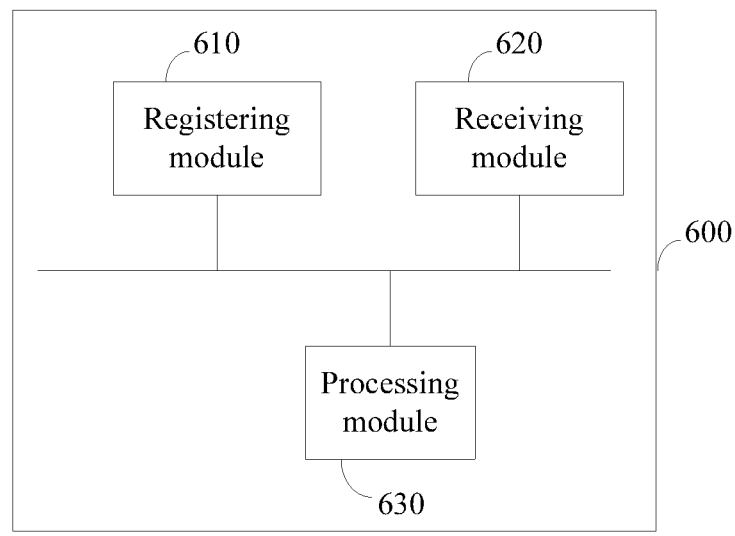
FIG. 6 is a schematic diagram of an Ethernet interface hard disk according to an embodiment of the present disclosure.

Referring to FIG. 6, an embodiment of the present disclosure provides an Ethernet interface hard disk 600, where the Ethernet interface hard disk is applied to the cluster storage system shown in FIG. 1, and the cluster storage system includes a controller, the Ethernet interface hard disk, and a hard disk information database, where the Ethernet interface hard disk has an extended service capability, and the extended service capability does not include a data storage capability. The Ethernet interface hard disk 600 may include a registering module 610, configured to register information about the extended service capability with the hard disk information database such that the controller acquires the information about the extended service capability from the hard disk information database, a receiving module 620, configured to when the information about the extended service capability meets an extended service capability required by a service request, receive the service request from the controller, and a processing module 630, configured to process the service request.

In some embodiments of the present disclosure, the information about the extended service capability includes at least one type of the following: information about a basic hard disk capability, information about an advanced service capability, and information about a capability set.

The information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported.

The information about an advanced service capability includes the identification information of the Ethernet interface hard disk and description information of the advanced service capability, where the description information of the advanced service capability includes at least one type of the following information: a capability name, a capability identifier, and a capability parameter option.

The information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

The Ethernet interface hard disk provided in this embodiment of the present disclosure can execute a method procedure of the service processing method shown in FIG. 3, which is not described herein again in this embodiment of the present disclosure.

It can be learned from the foregoing description that, in this embodiment of the present disclosure, the following technical solution is used, an Ethernet interface hard disk registers information about its own extended service capability with a hard disk information database for a controller to acquire by means of query such that the controller may query, after receiving a service request, the hard disk information database to obtain an Ethernet interface hard disk that has a corresponding extended service capability, schedule the service request to the Ethernet interface hard disk for processing, and instruct the Ethernet interface hard disk to process the received service request, thereby improving service processing efficiency.

Figure 7:
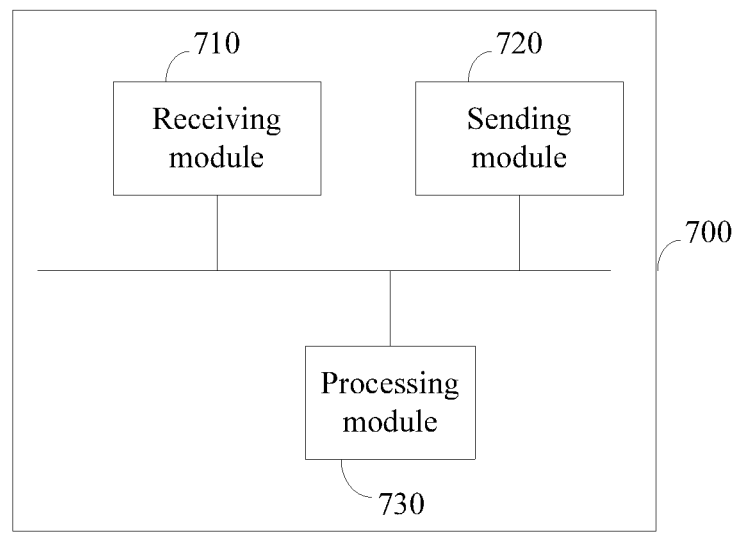
FIG. 7 is a schematic diagram of another Ethernet interface hard disk according to an embodiment of the present disclosure.

Referring to FIG. 7, an embodiment of the present disclosure provides an Ethernet interface hard disk 700, where the Ethernet interface hard disk is applied to the cluster storage system shown in FIG. 1, and the cluster storage system includes a controller, the Ethernet interface hard disk, and a hard disk information database, where the Ethernet interface hard disk has an extended service capability, and the extended service capability does not include a data storage capability. The Ethernet interface hard disk 700 may include a receiving module 710, configured to receive an extended service capability query message sent by the controller, a sending module 720, configured to return information about an extended service capability of the Ethernet interface hard disk to the controller, the receiving module 710, further configured to when the information about the extended service capability meets an extended service capability required by a service request, receive the service request from the controller, and a processing module 730, configured to process the service request.

In some embodiments of the present disclosure, the information about the extended service capability includes at least one type of the following: information about a basic hard disk capability, information about an advanced service capability, and information about a capability set.

The information about a basic hard disk capability includes identification information of the Ethernet interface hard disk and description information of the basic hard disk capability, where the description information of the basic hard disk capability includes at least one type of the following information: a quantity of ports, a supported port type, a type of a processor embedded in a hard disk, a hard disk rotational speed, and whether speed regulation or sleeping is supported.

The information about an advanced service capability includes the identification information of the Ethernet interface hard disk and description information of the advanced service capability, where the description information of the advanced service capability includes at least one type of the following information: a capability name, a capability identifier, and a capability parameter option.

The information about a capability set includes the identification information of the Ethernet interface hard disk and description information of the capability set, where the description information of the capability set includes an identifier of the capability set, and description information of a basic hard disk capability included in the capability set or description information of an advanced service capability included in the capability set.

The Ethernet interface hard disk provided in this embodiment of the present disclosure can execute a method procedure of the service processing method shown in FIG. 4, which is not described herein again in this embodiment of the present disclosure.

In this embodiment of the present disclosure, the following technical solution is used, a controller sends an extended service capability query message when necessary, and an Ethernet interface hard disk reports information about its own extended service capability to the controller after receiving the extended service capability query message such that the controller may select, after receiving a service request, an Ethernet interface hard disk that has a corresponding extended service capability, schedule the service request to the Ethernet interface hard disk for processing, and instruct the Ethernet interface hard disk to process the received service request, thereby improving service processing efficiency.

An embodiment of the present disclosure further provides a cluster storage system. As shown in FIG. 1, the cluster storage system includes the controller shown in the embodiment of FIG. 5, and the Ethernet interface hard disk shown in the embodiment of FIG. 6 or FIG. 7.

Figure 8:
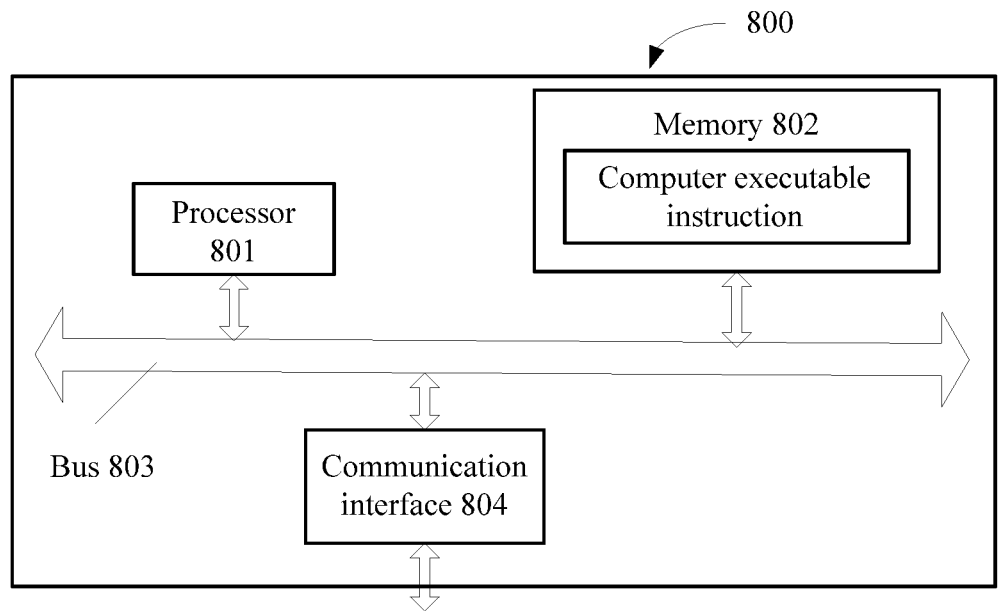
FIG. 8 is a schematic diagram of another controller according to an embodiment of the present disclosure.

As shown in FIG. 8, an embodiment of the present disclosure further provides a controller 800, where the controller includes a processor 801, a memory 802, a bus 803, and a communication interface 804.

The memory 802 is configured to store a computer executable instruction, and the processor 801 is connected to the memory 802 using the bus 803, and when the controller runs, the processor 801 executes the computer executable instruction stored in the memory 802 such that the controller executes the service processing method shown in the embodiment of FIG. 2.

Figure 9:
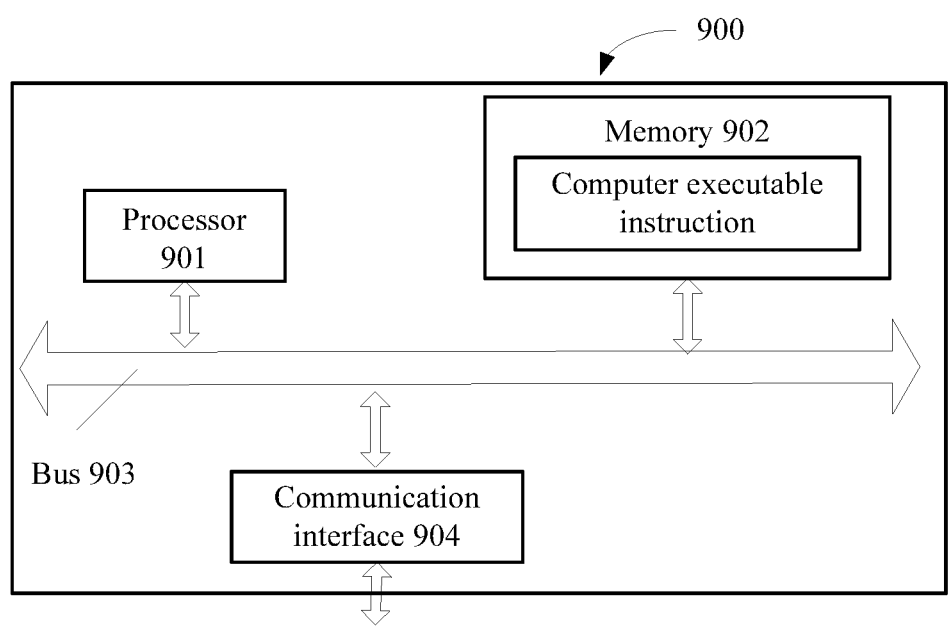
FIG. 9 is a schematic diagram of still another Ethernet interface hard disk according to an embodiment of the present disclosure.

As shown in FIG. 9, an embodiment of the present disclosure further provides an Ethernet interface hard disk 900, where the Ethernet interface hard disk includes a processor 901, a memory 902, a bus 903, and a communication interface 904.

The memory 902 is configured to store a computer executable instruction, and the processor 901 is connected to the memory 902 using the bus 903, and when the Ethernet interface hard disk runs, the processor 901 executes the computer executable instruction stored in the memory 902 such that the Ethernet interface hard disk executes the service processing method shown in the embodiment of FIG. 3 or FIG. 4.

An embodiment of the present disclosure further provides a computer storage medium, where the computer readable medium includes a computer executable instruction such that when a processor of a computer executes the computer executable instruction, the computer executes the service processing method shown in the embodiment of FIG. 2.

An embodiment of the present disclosure further provides a computer storage medium, where the computer readable medium includes a computer executable instruction such that when a processor of a computer executes the computer executable instruction, the computer executes the service processing method shown in the embodiment of FIG. 3 or executes the service processing method shown in the embodiment of FIG. 4.

In the foregoing embodiments, the description of each embodiment has respective focuses. For a part that is not described in detail in an embodiment, refer to related descriptions in other embodiments.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also understand that all the embodiments described in this specification belong to exemplary embodiments, and the involved actions and modules are not necessarily mandatory to the present disclosure.

A person of ordinary skill in the art may understand that all or some of the steps of the methods in the embodiments may be implemented by a program instructing relevant hardware. The program may be stored in a computer readable storage medium. The storage medium may include: a read-only memory (ROM), a random access memory (RAM), a magnetic disk, an optical disc, or the like.

The foregoing describes in detail the service processing method, the related device, and the cluster storage system that are provided in the embodiments of the present disclosure. The principles and implementation manners of the present disclosure are expounded in this specification using specific examples. Illustration of the foregoing embodiments is merely used to help understand the method of the present disclosure and core ideas thereof. In addition, a person of ordinary skill in the art may make variation to the specific implementation manners and application scopes according to the idea of the present disclosure. Therefore, this specification shall not be construed as a limitation on the present disclosure.

What is claimed is:

1. A service processing method, the service processing method being applied to a controller in a cluster storage system comprising the controller and multiple Ethernet interface hard disks, each of the Ethernet interface hard disks having a supported extended service capability, the supported extended service capabilities not comprising a data storage capability, and the service processing method comprising:
   receiving, by the controller, a service request;
   determining, by the controller, a required extended service capability required by the service request;
   acquiring, by the controller, first information about a first extended service capability of the supported extended service capabilities provided by at least one of the Ethernet interface hard disks, the controller acquiring the first information from a hard disk information database that stores the supported extended service capabilities of the at least one of the Ethernet interface hard disks, the supported extended service capabilities of the at least one of the Ethernet interface hard disks comprising at least two of performing virus checking, executing an integrity check on data, compressing data, migrating data, copying data, encrypting data, or executing a user-defined policy, and the supported extended service capabilities of the at least one of the Ethernet interface hard disks being arranged into groups of extended service capabilities;
   obtaining current resource use situations of the multiple Ethernet interface hard disks; and
   instructing, by the Controller according to the first information about the first extended service capability provided by the at least one of the Ethernet interface hard disks and the current resource use situations of the multiple Ethernet interface hard disks, one of the groups of the extended service capabilities provided by a first Ether net interface hard disk of the Ethernet interface hard disks to process the service request, the first Ethernet interface hard disk having the required extended service capability.

2. The service processing method of claim 1, wherein acquiring, by the controller, the first information about the first extended service capability provided by the at least one of the Ethernet interface hard disks comprises acquiring, by the controller by querying the hard disk information database, the first information about the first extended service capability being provided by the at least one of the Ethernet interface hard disks, and the hard disk information database storing supported information about the supported extended service capabilities of the Ethernet interface hard disks.

3. The service processing method of claim 1, wherein acquiring, by the controller, the first information about the first extended service capability provided by the at least one of the Ethernet interface hard disks comprises:
   sending, by the controller, an extended service capability query message to each of the Ethernet interface hard disks; and
   receiving the first information about the first extended service capability from the at least one of the Ethernet interface hard disks.

4. The service processing method of claim 1, wherein the first information about the first extended service capability comprises second information about a first basic hard disk capability, the second information about the first basic hard disk capability indicating identification information of the Ethernet interface hard disk and first description information of the first basic hard disk capability, the first description information of the first basic hard disk capability comprising at least one of a quantity of ports, a supported port type, a type of a processor embedded in a hard disk, a hard disk rotational speed, a speed regulation support, or a sleeping support.

5. The service processing method of claim 1, wherein the first information about the first extended service capability comprises third information about a first advanced service capability, the third information about the first advanced service capability indicating identification information of the Ethernet interface hard disk and second description information of the first advanced service capability, the second description information of the first advanced service capability comprising at least one of a capability name, a capability identifier, or a capability parameter option.

6. The service processing method of claim 1, wherein the first information about the first extended service capability comprises fourth information about a capability set, the fourth information about the capability set indicating the identification information of the Ethernet interface hard disk and third description information of the capability set, and the third description information of the capability set indicating either an identifier of the capability set and fourth description information of a second basic hard disk capability or fifth description information of a second advanced service capability.

7. The service processing method of claim 6, wherein the identification information of the Ethernet interface hard disk comprises at least one of a vendor identifier, a product identifier, a hard disk serial number, or a firmware version identifier.

8. A service processing method, the service processing method being applied to an Ethernet interface hard disk and a cluster storage system comprising a controller, the Ethernet interface hard disk, and a hard disk information database, the Ethernet interface hard disk having a first extended service capability that does not comprise a data storage capability, and the service processing method comprising:
   registering, by the Ethernet interface hard disk, first information about the first extended service capability with the hard disk information database to enable the controller to acquire the first information about the first extended service capability from the hard disk information database, the hard disk information database storing supported extended service capabilities of the Ethernet interface hard disk, the supported extended service capabilities of the Ethernet interface hard disk comprising at least two of performing virus checking, executing an integrity check on data, compressing data, migrating data, copying data, encrypting data, or executing a user-defined policy, and the supported extended service capabilities of the Ethernet interface hard disks being arranged into groups of extended service capabilities;
   obtaining a current resource use situation of the Ethernet interface hard disk;

receiving, by the Ethernet interface hard disk, a service request from the controller when the first information about the first extended service capability meets a required extended service capability required by the service request and when the current resource use situation of the Ethernet interface hard disk meets a retired resource use situation; and processing, by one of the groups of the extended service capabilities provided by the Ethernet interface hard disk, the service request received from the controller.

9. The service processing method of claim 8, wherein the first information about the first extended service capability comprises at least one of second information about a first basic hard disk capability, third information about a first advanced service capability, or fourth information about a capability set, the second information about the first basic hard disk capability indicating identification information of the Ethernet interface hard disk and first description information of the first basic hard disk capability, the first description information of the first basic hard disk capability comprising at least one of a quantity of ports, a supported port type, a type of a processor embedded in a hard disk, a hard disk rotational speed, a speed regulation support, or a sleeping support, the third information about the first advanced service capability indicating the identification information of the Ethernet interface hard disk and second description information of the first advanced service capability, the second description information of the first advanced service capability comprising at least one of a capability name, a capability identifier, or a capability parameter option, the fourth information about the capability set indicating the identification information of the Ethernet interface hard disk and third description information of the capability set, and the third description information of the capability set indicating either an identifier of the capability set and fourth description information of a second basic hard disk capability or fifth description information of a second advanced service capability.

10. A service processing method, the service processing method being applied to an Ethernet interface hard disk and a cluster storage system comprising a controller and the Ethernet interface hard disk, the Ethernet interface hard disk having a first extended service capability that does not comprise a data storage capability, and the service processing method comprising:

receiving, by the Ethernet interface hard disk, an extended service capability query message from the controller;

returning first information about the first extended service capability of the Ethernet interface hard disk to the controller for storage in a hard disk information database, the hard disk information database storing supported extended service capabilities of the Ethernet interface hard disk, the supported extended service capabilities of the Ethernet interface hard disk comprising at least two of performing virus checking, executing an integrity check on data, compressing data, migrating data, copying data, encrypting data, or executing a user-defined policy, and the supported extended service capabilities of the Ethernet interface hard disks being arranged into groups of extended service capabilities;

obtaining a current resource use situation of the Ethernet interface hard disk;

receiving, by the Ethernet interface hard disk, a service request from the controller when the first information about the first extended service capability meets a required extended service capability required by the service request and when the current resource use situation of the Ethernet interface hard disk meets a required resource use situation; and processing the service request received from the controller with one of the groups of the extended service capabilities.

11. The service processing method of claim 10, wherein the first information about the first extended service capability comprises at least one of second information about a first basic hard disk capability, third information about a first advanced service capability, and fourth information about a capability set, the second information about the first basic hard disk capability indicating identification information of the Ethernet interface hard disk and first description information of the first basic hard disk capability, the first description information of the first basic hard disk capability comprising at least one of a quantity of ports, a supported port type, a type of a processor embedded in a hard disk, a hard disk rotational speed, a speed regulation support, or a sleeping support, the third information about the first advanced service capability indicating the identification information of the Ethernet interface hard disk and second description information of the first advanced service capability, the second description information of the first advanced service capability comprising at least one of a capability name, a capability identifier, and a capability parameter option, the fourth information about the capability set indicating the identification information of the Ethernet interface hard disk and third description information of the capability set, the third description information of the capability set indicating either an identifier of the capability set and fourth description information of a second basic hard disk capability or fifth description information of a second advanced service capability.

12. A controller configured to communicate with multiple Ethernet interface hard disks each comprising a supported extended service capability that does not comprise a data storage capability, the controller comprising:

a bus;

a communication interface coupled to the bus;

a processor coupled to the bus; and a memory coupled to the processor via the bus, the memory being configured to store computer executable instructions that when executed by the processor cause the controller to;

receive a service request;

determine a required extended service capability required by the service request;

acquire first information about a first extended service capability of the supported extended service capabilities provided by at least one of the Ethernet interface hard disks, the controller acquiring the first information from a hard disk information database that stores the supported extended service capabilities of the at least one of the Ethernet interface hard disks, and the supported extended service capabilities of the at least one of the Ethernet interface hard disks comprising at least two of performing virus checking, executing an integrity check on data, compressing data, migrating data, copying data, encrypting data, or executing a user-defined policy, and the supported extended service capabilities of the Ethernet interface hard disks being arranged into groups of extended service capabilities;

obtain current resource use situations of the multiple Ethernet interface hard disks; and instruct, according to the first information about the first extended service capability provided by the at least one of the Ethernet interface hard disks and the current resource use situations of the multiple Ethernet interface hard disks, one of the groups of the extended service capabilities provided by a first Ethernet interface hard disk of the Ethernet interface hard disks to process the service request, the first Ethernet interface hard disk having the required extended service capability.

13. The controller of claim 12, wherein the instructions further cause the controller to acquire the first information by querying the hard disk information database, the first information about the first extended service capability provided by the at least one of the Ethernet interface hard disks, and the hard disk information database storing supported information about the supported extended service capabilities of the Ethernet interface hard disks.

14. The controller of claim 12, wherein the instructions further cause the controller to acquire the first information by:
sending an extended service capability query message to each of the Ethernet interface hard disks; and
receiving the first information about the first extended service capability from the at least one of the Ethernet interface hard disks.

15. The controller of claim 12, wherein the first information about the first extended service capability comprises at least one of second information about a first basic hard disk capability, third information about a first advanced service capability, or fourth information about a capability set, the second information about the first basic hard disk capability indicating identification information of the Ethernet interface hard disk and first description information of the first basic hard disk capability, the first description information of the first basic hard disk capability comprising at least one of a quantity of ports, a supported port type, a type of a processor embedded in a hard disk, a hard disk rotational speed, a speed regulation support, or a sleeping support, the third information about the first advanced service capability indicating the identification information of the Ethernet interface hard disk and second description information of the first advanced service capability, the second description information of the first advanced service capability comprising at least one of a capability name, a capability identifier, or a capability parameter option, the fourth information about the capability set indicating the identification information of the Ethernet interface hard disk and third description information of the capability set, and the third description information of the capability set indicating either an identifier of the capability set and fourth description information of a second basic hard disk capability or fifth description information of a second advanced service capability.

16. The controller of claim 15, wherein the identification information of the Ethernet interface hard disk comprises at least one of a vendor identifier, a product identifier, a hard disk serial number, or a firmware version identifier (ID).

17. An Ethernet interface hard disk comprising:
a bus;
a communication interface coupled to the bus;
a processor coupled to the bus; and
a memory coupled to the processor via the bus, the memory being configured to store computer executable instructions that when executed by the processor cause the Ethernet interface hard disk to:

register first information about first extended service capability with a hard disk information database to enable a controller to acquire the first information about the first extended service capability from the hard disk information database, the hard disk information database storing supported extended service capabilities of the Ethernet interface hard disk, and the supported extended service capabilities of the Ethernet interface hard disk comprising at least two of performing virus checking, executing an integrity check on data, compressing data, migrating data, copying data, encrypting data, or executing a user-defined policy, and the supported extended service capabilities of the Ethernet interface hard disks being arranged into groups of extended service capabilities;
obtain a current resource use situation of the Ethernet interface hard disk;
receive a service request from the controller; and
process the service request by one of the groups of the extended service capabilities when the first information about the first extended service capability meets a required extended service capability required by the service request and when the current resource use situation of the Ethernet interface hard disk meets a required resource use situation.

18. The Ethernet interface hard disk of claim 17, wherein the first information about the first extended service capability comprises second information about a first basic hard disk capability, the second information about the first basic hard disk capability indicating identification information of the Ethernet interface hard disk and first description information of the first basic hard disk capability, the first description information of the first basic hard disk capability comprising at least one of a quantity of ports, a supported port type, a type of a processor embedded in a hard disk, a hard disk rotational speed, a speed regulation support, or a sleeping support.

19. The Ethernet interface hard disk of claim 17, wherein the first information about the first extended service capability comprises third information about a first advanced service capability, the third information about the first advanced service capability indicating the identification information of the Ethernet interface hard disk and second description information of the first advanced service capability, the second description information of the first advanced service capability comprising at least one of a capability name, a capability identifier, or a capability parameter option.

20. The Ethernet interface hard disk of claim 17, wherein the first information about the first extended service capability comprises fourth information about a capability set, the fourth information about the capability set indicating the identification information of the Ethernet interface hard disk and third description information of the capability set, and the third description information of the capability set indicating either an identifier of the capability set and fourth description information of a second basic hard disk capability or fifth description information of a second advanced service capability.

21. A computer readable medium comprising computer executable instructions for execution by a processor of a controller in a cluster storage system comprising the controller and multiple Ethernet interface hard disks, each of the Ethernet interface hard disks having a supported extended service capability that does not comprise a data storage capability, and when the computer executable instructions are executed by the processor, the processor causes the controller to:

receive, by the controller, a service request;

determine, by the controller, a required extended service capability required by the service request;

acquire, by the controller, first information about a first extended service capability of the supported extended service capabilities provided by at least one of the Ethernet interface hard disks, the controller acquiring the first information from a hard disk information database that stores the supported extended service capabilities of the at least one of the Ethernet interface hard disks, the supported extended service capabilities of the at least one of the Ethernet interface hard disks comprising at least two of performing virus checking, executing an integrity check on data, compressing data, migrating data, copying data, encrypting data, or executing a user-defined policy and the supported extended service capabilities of the at least one of the Ethernet interface hard disks being arranged into groups of extended service capabilities;

obtain current resource use situations of the multiple Ethernet interface hard disks; and instruct, by the controller according to the first information about the first extended service capability provided by the at least one of the Ethernet interface hard disks and the current resource use situations of the multiple Ethernet interface hard disks, one of the groups of the extended service capabilities provided by a first Ethernet interface hard disk of the Ethernet interface hard disks to process the service request, the first Ethernet interface hard disk having the required extended service capability.

22. The computer readable medium of claim 21, wherein the instructions further cause the controller to acquire the first information, by the controller by querying the hard disk information database, the first information about the first extended service capability being provided by the at least one of the Ethernet interface hard disks, and the hard disk information database storing support information about the supported extended service capabilities of the Ethernet interface hard disks.

* * * * *

UNITED STATES PATENT AND TRADEMARK OFFICE
CERTIFICATE OF CORRECTION

PATENT NO. : 10,623,492 B2
APPLICATION NO. : 15/204457
DATED : April 14, 2020
INVENTOR(S) : Xiaosong Lei Page 1 of 1

It is certified that error appears in the above-identified patent and that said Letters Patent is hereby corrected as shown below:

In the Claims

Claim 1, Column 21, Line 41: "by the Controller according" should read "by the controller according"

Signed and Sealed this
Twenty-sixth Day of May, 2020

Andrei Iancu
*Director of the United States Patent and Trademark Office*